United States Patent Office 3,309,251
Patented Mar. 14, 1967

3,309,251
LIQUID EXPLOSIVE MIXTURE CONTAINING NITROMETHANE AND ETHYLENEDIAMINE
Ludwig F. Audrieth, 1005 W. California Ave., Urbana, Ill. 61801, and Leonard H. Eriksen, 29 Dartmouth Road, and William R. Tomlinson, 117 Morris Ave., both of Mountain Lakes, N.J. 07046
No Drawing. Continuation of application Ser. No. 738,596, Apr. 1, 1947. This application Aug. 12, 1966, Ser. No. 572,149
3 Claims. (Cl. 149—89)

This application is a continuation of Serial No. 738,596, filed April 1, 1947, now abandoned.

This invention relates to a new composition of matter in the form of a liquid organic explosive mixture consisting mainly of mono-nitromethane and a hydrated or anhydrous amine. We have discovered that when the proper ingredients are simply mixed in certain proportions the resultant mixtures have certain desirable and useful properties. In particular, these mixtures are powerful explosives capable of being dependably detonated by the military standard Corps of Engineers Blasting Cap and that unconfined, such mixtures, when so initiated, will dependably propagate detonation in thin layers or files of small diameter; down to or below, 0.25 inch in many cases. In addition, these compositions are sufficiently stable mechanically to endure easily without change normal handling and other mechanical action involved in normal usage.

Various types of liquid explosives have been developed in the past, each type possessing its peculiar characteristics, advantages, and disadvantages. For instance, (1) those based on oxides of nitrogen and liquid combustibles and (2) those based on acids and liquid fuels are both unsuitable for military usage due to instability and sensitivity to impact or friction, when compared to standard military or commercial explosives. The only previously listed mono-nitromethane explosives were (a) either granular, not liquid, mixtures, the mono-nitromethane being fixed in an adsorbent, or (b) mixtures such as mono-nitromethane and aniline, which are very difficult to detonate and which propagate detonation erratically and unreliably even in columns of one to three inches in diameter or more. We claim novelty by virtue of the fact that our compositions, prepared by simple mixing of nitromethane, with the proper amounts of appropriate amines, even in the presence of moderate quantities of non-explosive diluents such as water, alcohol, etc., are powerful explosive mixtures, safe to handle and with explosive and physical properties fitting them for usage for a large variety of purposes. Such usage may be indicated by the following examples:
 (a) Mine field clearance.
 (b) Demolition of defensive positions in snakes.

Detonable compositions may be prepared in accordance with the present invention by mixing with mono-nitromethane about 1 to about 20 percent of an amine selected from one or more of the following classes of amines or polyamines: (a) primary aliphatic amines, (b) primary hydroxyaliphatic amines, (c) secondary aliphatic amines, (d) primary cycloaliphatic amines, (e) secondary heterocyclic amines, and (f) mixtures of the above amines, or molecules obtained by reactions leading to addition products of the above amines which do not destroy the identity of amine groups.

It has been found that as much as 10 percent of materials such as glycerine, ethyl alcohol, and ethyl Cellosolve may be added to a sensitive mixture without appreciably impairing its power, sensitivity to initiation or ability to propagate, even under severe conditions. In addition, up to about 3 to 5 percent water in solution can be readily tolerated, although anhydrous mixtures or those lower in moisture content are to be preferred. Typical examples of the type mixture found to possess desirable properties, and their approximate characteristics are:

| Amine | 95/5 Mono-Nitromethane/Amine Mixtures | | |
|---|---|---|---|
| | Ethylenediamine | n-Butylamine | Morpholine |
| Rate of detonation, m/s | 6,000 | 6,000 | 6,000 |
| Sensitivity to Bullet Impact | Low | Low | Low |
| Sensitivity to Impact | Low | Low | Low |
| Sensitivity to Friction | Low | Low | Low |
| Tendency of Ingredients to Separate on Standing | Moderate | Little | None |
| Minimum Propagation Dia., in. | ≤¼ | ≤¼ | ≤¼ |
| Brisance and Power, Wt. Basis | Comparable to TNT | | |

These compositions are prepared by simply mixing the components; no special procedure of mixing is required.

We claim:
1. A liquid organic explosive consisting essentially of mono-nitromethane and from about 1 to about 20 percent by weight of ethylene diamine.
2. A liquid organic explosive as in claim 1 which consists essentially by weight of 95 percent mono-nitromethane and 5 percent ethylene diamine.
3. A liquid organic explosive as in claim 1 which includes as much as 10 percent of non-explosive diluents selected from the group consisting of
 glycerine
 ethyl alcohol
 ethyl Cellosolve.

References Cited by the Examiner
UNITED STATES PATENTS
2,891,852  6/1959  Schaad _____ 149—89
2,967,099  1/1961  Pool _____ 149—89
3,132,060  5/1964  Beegle et al. _____ 149—89 X
3,239,395  3/1966  Laurence _____ 149—89

OTHER REFERENCES
Urbanski, T.: Chemistry and Technology of Explosives, vol. 1, 1964, The Macmillan Co., New York, pp. 584–586.

CARL D. QUARFORTH, Primary Examiner.
S. J. LECHERT, JR., Assistant Examiner.